United States Patent
Lee

(10) Patent No.: US 7,220,049 B2
(45) Date of Patent: May 22, 2007

(54) BLENDER WITH A SAFE STARTING FUNCTION

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 437 days.

(21) Appl. No.: 10/913,313

(22) Filed: Aug. 9, 2004

(65) Prior Publication Data

US 2006/0028912 A1 Feb. 9, 2006

(51) Int. Cl.
*B02C 23/00* (2006.01)
*B01F 7/16* (2006.01)

(52) U.S. Cl. ................. 366/206; 366/601; 241/37.5
(58) Field of Classification Search .............. 366/205, 366/206, 314, 306, 601; 99/348; 241/37.5
See application file for complete search history.

(56) References Cited

U.S. PATENT DOCUMENTS 3,612,126 A * 10/1971 Emmons et al. ............ 366/205

4,487,509 A * 12/1984 Boyce ........................ 366/199
5,779,358 A *  7/1998 Bevington .................. 366/206
6,910,800 B2 *  6/2005 Wu ............................ 366/205

* cited by examiner

*Primary Examiner*—Tony G. Soohoo

(57) ABSTRACT

A blender with a safe starting function includes a motor unit, a blade base and a container. The motor unit has an insert groove and a micro switch. The blade base has a hole, a threaded rod, a spring and an actuating member with a press member and an actuating arm. The container has its bottom pressing the press members. In using, the blade base is positioned to let the actuating arm slide in the insert groove and press the micro switch to keep the blender in an on-power position. Then a user presses the on-off button to start the blender. If the blade base is rotated only for a very small angle from the on-power position to an off-power position, with the actuating arm separating from the micro switch, then the blender is in an off-power condition, impossible to be started even the on-off press button should be pressed.

1 Claim, 4 Drawing Sheets

BLENDER WITH A SAFE STARTING FUNCTION

BACKGROUND OF THE INVENTION

1. Field of the Invention

This invention relates to a blender with a safe starting function, particularly to one provided a blade base rotatable only for a small angle so as to keep the blender in an on-power and an off-power position to attain the safe staring function, with a on-off press button provided on a motor unit also to be used. The blade base is combined on the motor unit, having two holes at two sides and a threaded rod fitted around with a spring and an actuating member. The actuating member has a press member at one side and an actuating arm at the other side. The motor unit has an insert groove and a micro switch fixed in the insert groove for the actuating arm of the actuating member of the blade base to contact or separate from so that the power of the blender may be kept in the on-power and the off-power position. Then when the blade base is rotated only for a very small angle to the on-power position where the actuating arm contact and press the micro switch, and a user also presses the on-off press button on the motor unit, then the blender is started to operate blending fruit. But if the blade base is rotated reversely only a very small angle from the on-power position to the off-power position, then the actuating arm separate from the micro switch, so the blender could not be started to operate even if the on-off press button on the motor unit should be pressed down.

2. Description of the Prior Art

Conventional blenders generally have no safety device for a switch, so a user once connects its electric cord with power and presses on a on-off press button of a blender, the blender starts to let the blade rotate to cut fruit placed therein and makes juice. But if the on-off press button is pressed by accident or without knowing even though the container is not closed with a cap, the stirred juice may be splashed out around from the container. Or if a child presses the on-off button of the blender for a fun or by accident with a hand inserted in the container, the hand is likely to be cut, causing the hand seriously injured.

SUMMARY OF THE INVENTION

The invention has been devised to offer a blender with a safe starting function.

The feature of the invention is a motor unit provided with at least an insert groove and some engage grooves, and a micro switch fixed in the insert groove and electrically connected with power. Then a blade base is positioned on the motor unit, having a hole respectively at two sides and two threaded rods beside the holes with a spring and an actuating member fitted around the threaded rod and combined threadably tightly with a screw. The actuating member has a press member at one side to face and extend through the hole of the blade base and an actuating arm at the other side for contacting the micro switch. The blade base has several hooks at the bottom to hook with the engage grooves of the motor unit, and the blade base has female threads in the upper portion. A container is threadably combined with the blade base, having its bottom pressing on the press member of the actuating member of the blade base and male threads in the lower end.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
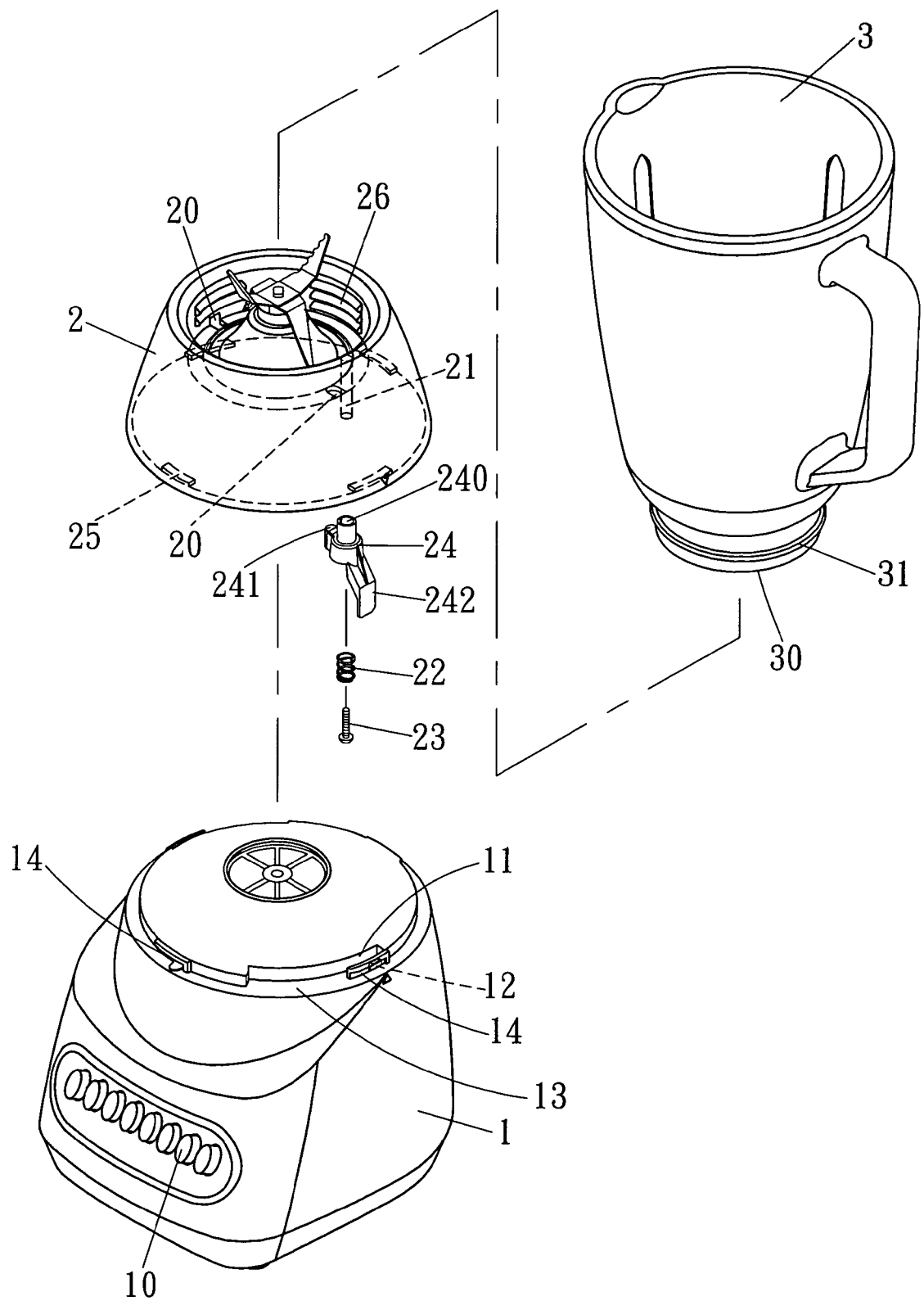
FIG. 1 is an exploded perspective view of a blender with a safe starting function in the present invention.
Figure 2:
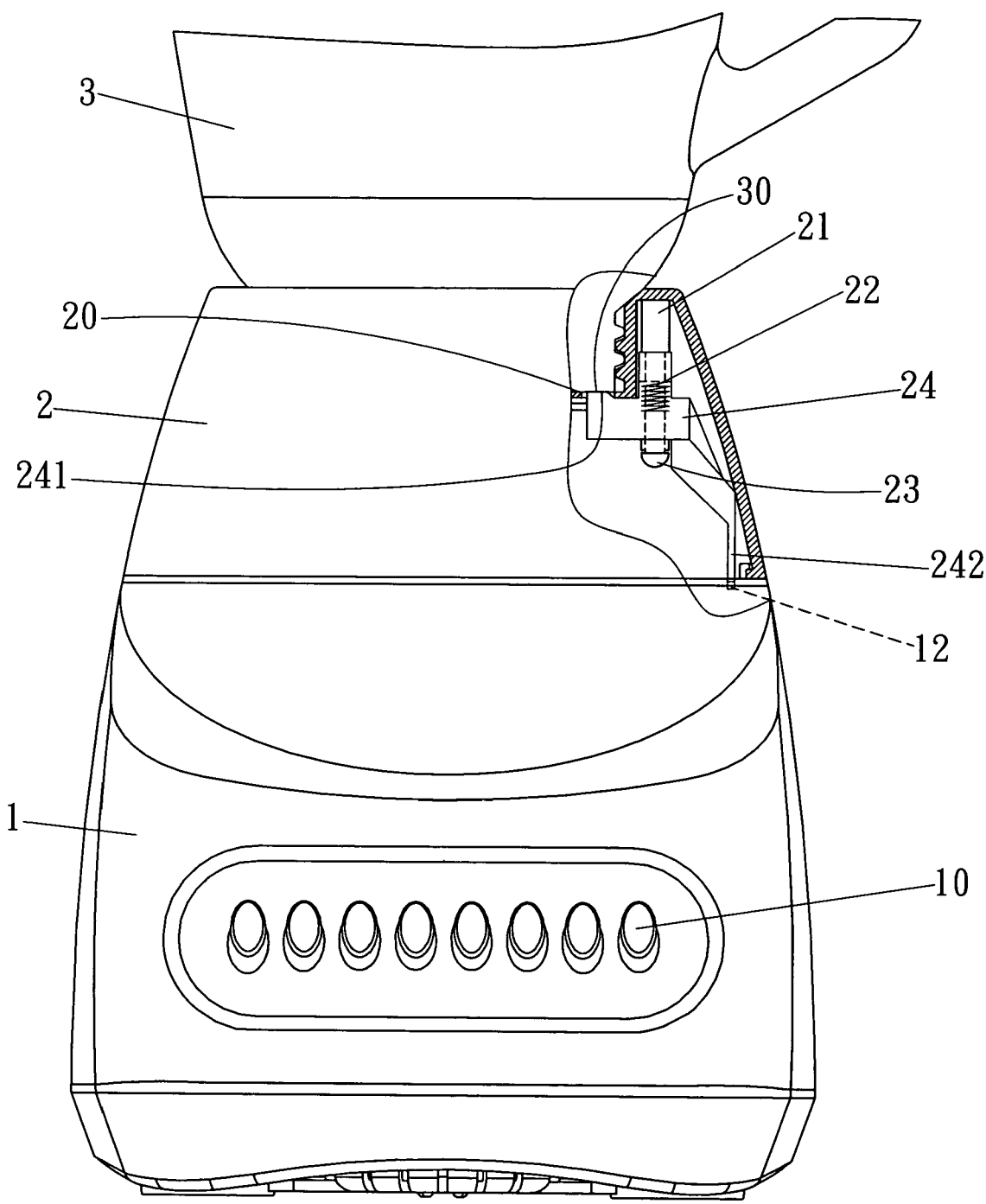
FIG. 2 is a side and partial cross-sectional view of the blender in the present invention.

A preferred embodiment of a blender with a safe starting function in the present invention, as shown in FIGS. 1 and 2, includes a motor unit 1, a blade base 2, and a container 3 as main components.

The motor unit 1 has several press buttons 10 arranged on an outer surface of the motor unit 1, an insert groove 11 respectively formed at the right and the left side of a circumferential edge of an upper surface, a micro switch 12 positioned in each insert groove 11 and electrically connected with the power inside the motor unit 1. The motor unit 1 further has a position edge 13 nearly on the right side of the circumference edge of the upper surface, and two symmetrical engage grooves 14 on the position edge 13.

The blade base 2 is positioned on the motor unit 1, having a hole 20 respectively at two sides, a threaded rod 21 respectively beside the two holes 20, a spring 22 and an actuating member 24 fitted around each threaded rod 21 and threadably combined tightly in place with a screw 23. The actuating member 24 has a hole 240 for the threaded rod 21 to pass through, and a press member 241 formed at one side to face and extend up through the hole 20 of he blade base 2, and an actuating arm 242 extending out from the other side. The blade base 2 further has plural hooks 25 formed spaced apart in an inner lower surface to engage with the engage grooves 14 of the motor unit 1 so as to let the blade base 2 combined stably and rotatable for only a very small angle back and forth on the motor unit 1.

The container 3 is threadably combined with the blade base 2, having the bottom 39 pressing down the two press members 241 of the two actuating members 24 at the two sides of the blade base 2, and male threads 31 formed in the lower end to engage the female threads 26 of the blade base 2 to combine threadably the blade base with the container 3.

In assembling, as shown in FIGS. 1 and 2, insert the threaded rod 21 of the blade base 2 in the hole 240 of the actuating member 24, with the press members 241 protruding out of the holes 20. Then fit the springs 22 around the threaded rods 21 and then engage stably the actuating members 24 with a screw 23. After that the container 3 is made to combine threadably with the blade base 2, with the male threads 31 engaging the female threads 26 of the blade base 2 to let the bottom 30 of the container 3 press down the two press members 241 of the two actuating members 24. At the same time, the actuating arm 242 of the actuating member 24 shifts down. Then the blade base 2 is combined with the motor unit 1, with the bottom of the blade base 2 resting on the position edge 13 of the motor unit 1, and with the hooks 25 of the blade base 2 sliding in the engage grooves and positioned in place, finishing the assembly of the blender of the invention.

Figure 3:
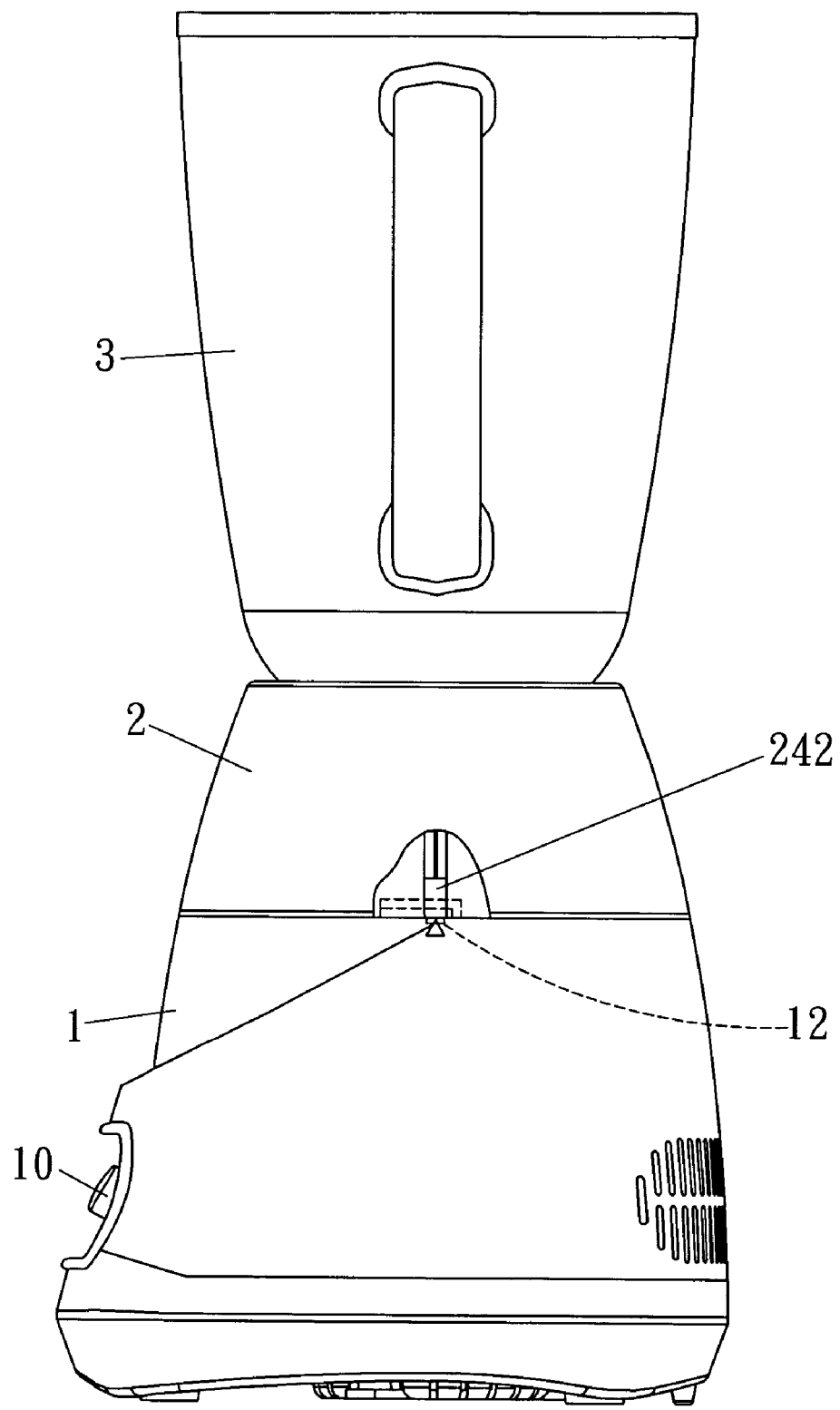
FIG. 3 is a side view of a actuating member pressing a micro switch in the present invention; and, FIG. 4 is a side view of the actuating member separating from the micro switch in the present invention.
Figure 4:
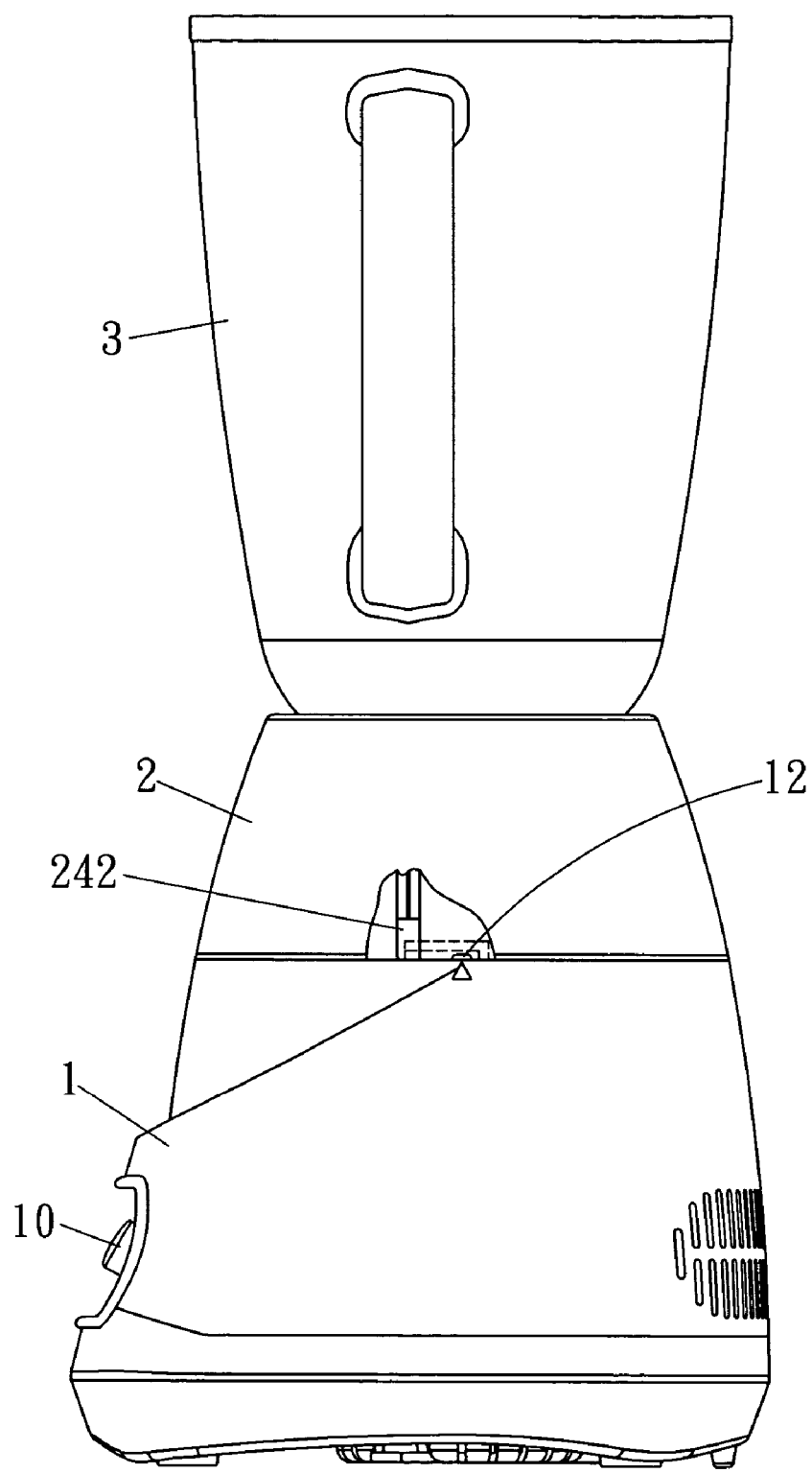

In using, referring to FIGS. 3 and 4, a user places the blade base 2 combined with the container 3 on the motor unit 1, with the bottom of the blade base 2 resting on the position edge 13 of the motor unit 1, with the hooks 25 engaging the engage grooves 14, with the actuating arm 242 of the actuating member 24 sliding in the engage groove 11 to contact and press down the micro switch 12 to keep the blender in a on-power position. Then the user presses an on-off press button of the press buttons 10 to start the blender for blending and churning fruit put therein. On the contrary, if the blade base 2 is rotated only for a very small angle to let the actuating arm 242 of the actuating members 24 separate from the micro switches 12, the power is turned off at once, in other words, the. blender is kept in an off-power position maintaining safety in using and keeping the blender from accidental dangers.

In general, the blender in the invention has to be kept in the on-power position of the blade base, then can be started to operate by pressing also the on-off press button. In case the blade base is rotated only for a very small angle from the on-position to the off-position, the blender could not be started to operate even if the on-off press button should be pressed down. Thus, the blender has a safe starting function.

While the preferred embodiment of the invention has been described above, it will be recognized and understood that various modifications may be made therein and the appended claims are intended to cover all such modifications that may fall within the spirit and scope of the invention.

What is claimed is:

1. A blender with a safe starting function comprising:

a motor unit provided with an insert groove and plural engage grooves formed on a circumferential edge of an upper surface, and a micro switch in said insert groove;

a blade base combined on said motor unit, having a hole at two sides and a threaded rod beside each said hole, a spring and an actuating member fitting around each said threaded rod and kept in place with a screw, said actuating member having a press member at one side of the actuating member and facing and protruding up through each respective hole and an actuating arm extending out from the other side of the actuating member, hooks formed in a lower end of the blade base to engage with said engage grooves of said motor unit, said blade base having female threads in an inner upper end portion; and, a container threadably combined with said blade base, having male threads in a lower end and its bottom pressing down said press members of said actuating members.

* * * * *